United States Patent [19]

Nye et al.

[11] 3,826,064
[45] July 30, 1974

[54] VAPOR-LIQUID SEPARATOR

[75] Inventors: James O. Nye, Friendswood; Miguel A. Salabarria, Texas City; David H. Westmoreland, Alvin, all of Tex.

[73] Assignee: Monsanto Company, St. Louis, Mo.

[22] Filed: Apr. 12, 1973

[21] Appl. No.: 350,456

[52] U.S. Cl. ................................................. 55/204
[51] Int. Cl. ............................................. B01d 19/00
[58] Field of Search ............... 55/38, 40, 41, 43, 52, 55/159, 177, 184, 189, 190, 203, 204, 205, 257

[56] References Cited
UNITED STATES PATENTS

| | | | |
|---|---|---|---|
| 2,037,426 | 4/1936 | McKeever | 55/184 |
| 2,811,219 | 10/1957 | Wenzl | 55/204 X |
| 3,003,580 | 10/1961 | Lanning | 55/52 X |

*Primary Examiner*—Charles N. Hart
*Assistant Examiner*—Ferris H. Lander

[57] ABSTRACT

An improved vapor-liquid separator includes a vertically mounted cylindrical vessel having a tangential fluid inlet means such as to produce a vortex or swirling effect of the fluid being introduced into the vessel. A liquid withdrawal conduit is disposed in the lower portion of the vessel to withdraw substantially vapor-free liquid product from the vessel. A vapor withdrawal conduit is disposed in the upper portion of the vessel and extends downwardly into the vessel, along the axis of the vessel, with an upwardly inclined annular catch-pan on the outside of the vapor withdrawal conduit between the upper end of the vessel and the lower open end of the vapor withdrawal conduit. A downwardly inclined annular drip skirt is located below the upwardly inclined catch-pan. Conduits drain the liquid collected in the annular channel formed by the junction of the catch-pan with the outer wall of the vapor withdrawal conduit to a point substantially removed from the open end of the vapor withdrawal conduit.

9 Claims, 3 Drawing Figures

VAPOR-LIQUID SEPARATOR

BACKGROUND OF THE INVENTION

The present invention relates to an improved vapor-liquid separator apparatus. More particularly, the present invention relates to an improved cylindrical vapor-liquid separator wherein a fluid stream is introduced into the separator vessel tangentially to the vessel walls thereby creating a vortex effect of liquid swirling around the walls of the vessel. Still more particularly, the present invention relates to an improved vapor-liquid separator apparatus that prevents carryover of even the smallest amounts of liquid in the vapor stream withdrawn from a cylindrical vapor-liquid separator having liquid swirling around the outer walls of the separator vessel.

Vapor-liquid separators are used in many commercial processes in the petroleum and chemical industries. For example, vapor-liquid separators are used to separate mixtures of oil and gas produced from petroleum wells. Additionally, vapor-liquid separators are used to separate mixed streams of vapor and liquid produced in various chemical processes. Vapor-liquid separators are also used in certain manufacturing steps wherein a liquid stream is passed to a vessel having a reduced pressure wherein a portion of the liquid is vaporized and is separated from the remaining unvaporized liquid. Such a vessel, normally known as a flash tank, is designed to have a maximum efficiency for separating liquid from vapor. In certain chemical processes, it is extremely important that none of the unvaporized liquid is carried over with the vapor-phase that is recovered from the vapor-liquid separator. For example, in the area of chemical processes using a homogeneous catalyst, wherein the catalyst can be made from extremely valuable materials such as platinum, palladium and the like, it is important that none of the dissolved catalyst be carried over with the vapor product that is recovered in such a flash tank.

Normally, vapor-liquid separators are cylindrical vessels with the feed to the vessel being introduced in a tangential manner. By introducing the feed tangentially into the vessel, there is no excessive turbulence or splashing that would normally result from the high velocity introduction of the liquid stream onto an impinging plate. Thus, the tangential entry of the fluid into the separating vessel produces a swirling or vortex effect whereby the liquid swirls around the walls of the vessel. Unvaporized liquid is withdrawn from the lower portion of the vessel and the vapor is withdrawn from the upper portion of the vessel.

Many different approaches have been made toward minimizing the amount of liquid that is carried overhead with the vapor that is recovered from conventional vapor-liquid separators. Such approaches have included the use of packed mist eliminators and the use of various baffles and the like to cut down on liquid carryover. Normally, such conventional approaches are sufficient to reduce, but not completely eliminate, the amount of liquid carryover in the vapor product. However, in such processes as chemical processes wherein a very valuable homogeneous catalyst is dissolved in the liquid that must be recycled to a reactor, it is essential that none of the liquid, containing the dissolved catalyst components, be carried overhead with the vapor product.

A peculiar effect has been observed in vapor-liquid separators wherein the liquid is swirled around the walls of the separator. That effect can be best described as a "creep effect" wherein a thin film of the swirling liquid gradually creeps up the walls of the separator vessel until it reaches the top of the vessel and then the thin film of liquid migrates toward the vapor withdrawal point near the top of the vessel. To minimize this creep effect, the vapor outlet conduit is normally extended into the interior of the vessel in the form of a "dip-leg." While this may minimize the creep effect, some of the liquid will actually migrate down the dip-leg and be carried away with the vapor withdrawn from the vessel. An additional approach has been to place a baffle or a drip skirt on the lower portion of the dip-leg to direct the migrating liquid away from the path of highest velocity of the vapor being withdrawn from the vessel, thus allowing the liquid to drop back down into the lower portion of the separator vessel without being carried overhead in the vapor product. This has also proven unsatisfactory in commercial vapor-liquid separators wherein the presence of even small amounts of liquid in the vapor cannot be tolerated.

It is, therefore, an object of this invention to provide an improved vapor-liquid separator.

An additional object of this invention is to provide an improved cylindrical vapor-liquid separator wherein a fluid stream is introduced into the separator vessel tangentially, thus creating a vortex effect of liquid swirling around the walls of the vessel. An additional object of this invention is to provide an improved vapor-liquid separator that effectively eliminates liquid carryover in vapor product produced in a vapor-liquid separator that has a vortex of liquid swirling around the outer walls of the cylindrical separator vessel.

Other advantages, aspects and objects of this invention will be apparent to those skilled in the art by examination of the specification and claims appended hereto.

SUMMARY OF THE INVENTION

The present invention is an improved vapor-liquid separator that includes a substantially cylindrical vessel, mounted with the axis of the vessel in a substantially vertical position. The fluid inlet conduit to the vessel communicates with the vessel and opens tangentially into such vessel such that a vortex or swirling of the fluid is obtained as it is introduced into the interior of the vessel. A liquid withdrawal conduit opens into the lower portion of the vessel to withdraw unvaporized liquid from the vessel. A vapor withdrawal conduit enters the upper portion of the vessel and is positioned in such a manner that the vapor withdrawal conduit extends vertically downwardly into the interior of the vessel, with the lower end having suitable openings to receive and withdraw vapor from the interior of the vessel. An upwardly inclined annular catch-pan is positioned on the outer side of the vapor withdrawal conduit at a point intermediate the inner top of the vessel and the lower open end of the vapor withdrawal conduit. This upwardly inclined annular catch-pan thereby forms an annular channel or trough extending around the vapor withdrawal conduit. Below the upwardly inclined annular catch-pan, a downwardly inclined annular drip skirt is disposed on the outer side of the vapor withdrawal conduit. Thus, the downwardly inclined annular drip skirt is positioned intermediate the upwardly inclined annular catch-pan in the lower open end of the vapor withdrawal conduit. At least one conduit is in open communication with the interior of the separating vessel at a point substantially below the open end of the vapor withdrawal conduit and the annular channel that is formed between the upwardly inclined catch-pan and the outer side of the vapor withdrawal conduit. Thus, as liquid migrates up the walls of the separator vessel and across to the downwardly extending vapor withdrawal conduit, such liquid collects and accumulates in the annular trough or channel that is formed by the upwardly inclined annular catch-pan and the outer wall of the vapor withdrawal conduit. Since there is an additional conduit in open communication with the annular channel and a point substantially lower in the vessel, any such liquid is drained away by gravity flow to a point substantially below and substantially removed from the lower open end of the vapor withdrawal conduit. If any liquid splashes or drips from the upper walls of the separator vessel and is not collected in the annular catch-pan described above, such liquid may fall on the downwardly inclined annular drip skirt that is disposed on the outer side of the vapor withdrawal conduit and below the annular catch-pan. This downwardly inclined annular drip skirt will carry the liquid down and away from the open end of the vapor withdrawal conduit and it will drip and fall back into the liquid in the lower portion of the separator vessel.

DESCRIPTION OF THE PREFERRED EMBODIMENTS

Figure 1:
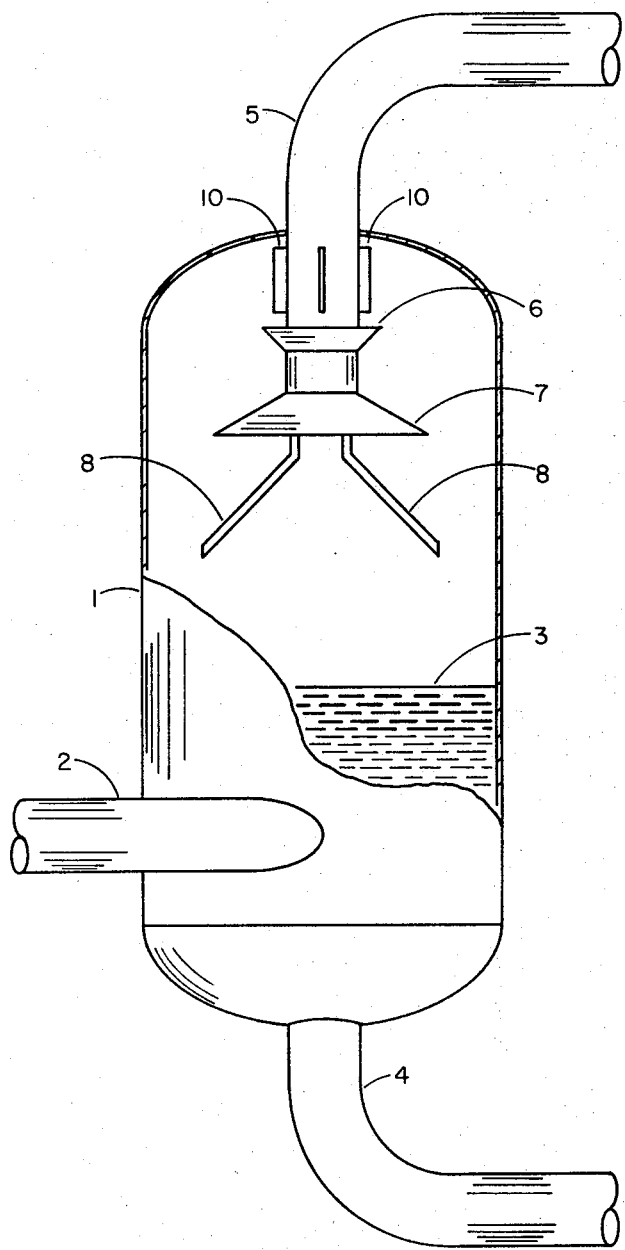
FIG. 1 is a side view of the vapor-liquid separator apparatus of this invention with the upper portion of the separator vessel being cut away to expose the vapor withdrawal conduit and associated apparatus that is mounted in the upper portion of the vessel.
Figure 2:
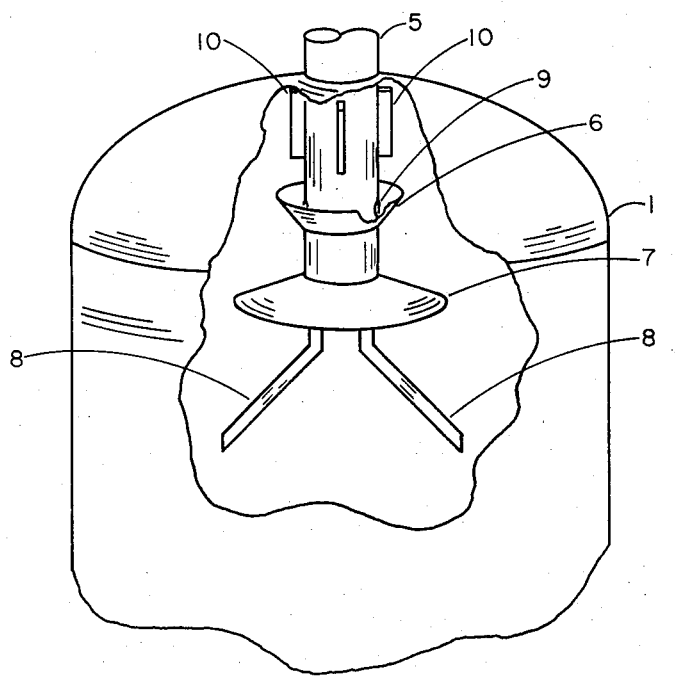
FIG. 2 is a perspective view of the upper portion of the vapor-liquid separator of this invention with a portion of the separator vessel wall being cut away to expose the downwardly extending vapor withdrawal conduit and the apparatus associated therewith. The view presented in FIG. 2 is from slightly above and slightly to the right of the view presented in FIG. 1 in order to illustrate the aperture in the vapor withdrawal conduit for withdrawing liquid that collects in the annular channel.

The preferred embodiments of this invention can best of illustrated by referring to the drawings. For convenience, all common elements bear the same numerical designation in the drawings.

Separator vessel 1 is a substantially cylindrical vessel with inlet conduit 2 being positioned in the lower portion thereof. Normally, vessel 1 will have dished or hemispherical heads, but in some cases, flat heads may be used. Preferably, vessel 1 is mounted with the long axis of the vessel being in a substantial vertical position. Inlet conduit 2 is positioned such that fluid being introduced into separator vessel 1 is introduced tangentially to the walls of the vessel, thereby creating a vortex or swirling effect of the liquid around the walls of the vessel. The tangential entry of the feed increases the efficiency of the vapor-liquid separation and also tends to reduce splashing, foaming and extreme turbulence of the liquid. Inlet conduit 2 has been illustrated as entering separator vessel 1 in the lower portion for convenience only. It should be noted that the exact point of entry into separator vessel 1 can be at almost any point along the vertical walls of the vessel so long as a swirling or vortex effect is obtained by the fluid feed. In fact, in some instances it may be desirable to introduce the feed near the top of the vessel and allow it to swirl around the walls in a downward path to achieve a better vapor-liquid separation. Under normal operation, liquid level 3 will be maintained in the separator vessel. Liquid withdrawal conduit 4 is disposed in the lower portion of the separator vessel to remove liquid product from the separation zone. Liquid withdrawal conduit 4 can be positioned anywhere in the vessel so long as its opening is below the liquid level in the vessel.

Figure 3:
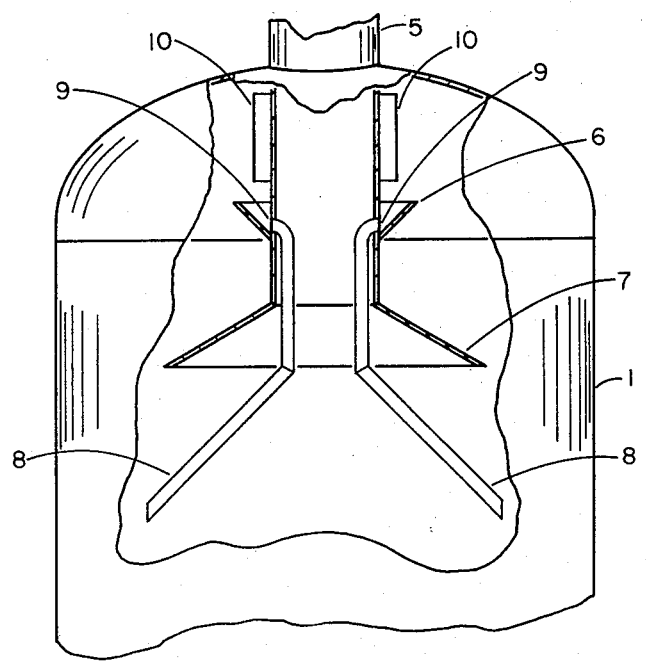
FIG. 3 is a cross-sectional view of the upper portion of the vapor-liquid separator of this invention showing the cross-sectional area of the top portion of the separator vessel with the downwardly extending vapor withdrawal conduit and apparatus associated therewith.

Vapor withdrawal conduit 5 is disposed in the upper portion of separator vessel 1 and extends downwardly into the interior of the separation zone. Preferably, vapor withdrawal conduit 5 extends substantially vertically downwardly along the axis of vessel 1. In some instances, however, vapor withdrawal conduit 5 may be at some other location than the axis of vessel 1 so long as it extends substantially vertically downwardly from the top of vessel 1. The lower end of vapor withdrawal conduit 5 has suitable openings to allow vapor to be withdrawn from the interior of vessel 1 and to pass overhead to suitable vapor recovery and treatment means not shown. Normally, the lower end of vapor withdrawal conduit 5 is merely open as shown in FIG. 3. Upwardly inclined annular catch-pan 6 is suitably attached to the outer side of vapor withdrawal conduit 5 at a point below the top of vessel 1 and above the lower open end of vapor withdrawal conduit 5. Thus, upwardly inclined catch-pan 6 forms an annular channel or trough around the outside of vapor withdrawal conduit 5 in the upper portion of separator vessel 1. It is important that a substantially liquid-tight seal be maintained at the junction between the lower portion of catch-pan 6 and the outer wall of vapor withdrawal conduit 5, in order to collect all liquid that may drain down the outer wall of the vapor withdrawal conduit.

At a point below upwardly inclined annular catch-pan 6, a downwardly inclined annular drip skirt 7 is suitably attached to the outside wall of vapor withdrawal conduit 5. Preferably, downwardly inclined annular drip skirt has a greater major diameter than the major diameter of upwardly inclined annular catch-pan 6.

As shown best by FIG. 3, the annular channel formed by upwardly inclined annular catch-pan 6 and the outer side of vapor withdrawal conduit 5 is in open communication with drain conduit 8 by way of aperture 9 which extends through the wall of vapor withdrawal conduit 5. Drain conduit 8 preferably extends up through the inside of vapor withdrawal conduit 5 to drain away any liquid that may accumulate in the annular channel. This drain is through an aperture 9 in the wall of vapor withdrawal conduit 5. Preferably, the lower end of drain conduit 8 extends substantially below the open end of vapor withdrawal conduit 5 in such a manner that liquid draining through drain conduit 8 is directed down and away from the open end of vapor withdrawal conduit 5, where maximum vapor velocity occurs during normal operation of the vapor liquid separator. In some instances, it may be desirable that the lower end of drain conduit 8 be submerged in liquid in the lower portion of the separator vessel, thus extending drain conduit 8 below normal liquid level 3. However, such aspect has not been illustrated here for the sake of simplicity.

The preferred locations of drain conduits 8 are illustrated in the Figures. In some cases, however, drain conduits 8 may be installed in such a manner as not to pass up through the inside of vapor withdrawal conduit 5. In such cases, drain conduits 8 would merely communicate with the interior of vessel 1 and the annular channel formed by the annular catch-pan 6 and the outer wall of vapor withdrawal conduit 5 by means of an aperture in the lower portion of catch-pan 6.

While it is not essential to the present invention, baffle plates 10 may be disposed along the outer wall of vapor withdrawal conduit 5 at a point intermediate the interior top portion of vessel 1 and upwardly inclined annular catch-pan 6. The function of baffles 10 is to reduce the swirling effect of liquid around the outside portion of vapor withdrawal conduit 5, thus allowing the liquid to more easily drain into the channel formed between the wall of vapor withdrawal conduit 5 and annular catch-pan 6.

In practice, it is essential that at least one drain conduit 8 be attached in open communication with the channel formed by upwardly inclined drain catch-pan 6 in the outer wall of vapor withdrawal conduit 5 and some point in the interior of vessel 1 substantially below and removed from the open end of vapor withdrawal conduit 5. If desired, more than one such drain conduit 8 can be utilized to carry away liquid that collects in the above described annular channel. Preferably, the lower outlet end of drain conduit 8 will be toward the side wall of vertical separator vessel 1, thus making the lower outlet portion of the conduit farther away from the vertical axis of separator vessel 1 than the upper inlet portion of drain conduit 8.

It is preferred that the slope of upwardly inclined catch-pan 6 be no more than 60° from the vertical. The exact slope, however, is a matter of choice and can vary according to the severity of the vortex or swirling effect in the separator. In normal practice, it is not necessary for annular catch-pan 6 to extend out from the outside of vapor withdrawal conduit 5 more than two or three inches, at its uppermost point. It is quite important that the only aperture in the walls of vapor withdrawal conduit 5 inside separator vessel 1 and above annular drip skirt 7, be those apertures that are in communication with drain conduit 8.

Downwardly inclined annular drip skirt 7 should be downwardly inclined at an angle of at least 30 degrees from the horizontal to effectively drain any liquid material down and away from the area of high vapor velocity that is associated with the open end of vapor withdrawal conduit 5 in the upper portion of separator vessel 1.

Under normal operations, it is desired that the major diameter of downwardly inclined annular drip skirt 7 be at least twice the diameter of vapor withdrawal conduit 5.

The various elements of the apparatus described herein can be made from any type of material, so long as such material possesses the proper physical properties to withstand the vapor-liquid separation environment. Thus, in certain services, high alloy materials may be required if the liquid or vapor contain corrosive materials.

It will be apparent to those skilled in the art from the foregoing description that many modifications and changes may be made in the apparatus specifically illustrated herein without departing from the scope and spirit of this invention.

What is claimed is:

1. A vapor-liquid separator apparatus including:
   a. a substantially cylindrical vessel mounted with the axis in a substantially vertical position;
   b. a fluid inlet conduit communicating with said vessel, said fluid inlet conduit opening tangentially into said vessel, thereby creating a vortex effect as said fluid is introduced into said vessel;
   c. a liquid withdrawal conduit communicating with the lower portion of said vessel;
   d. a vapor withdrawal conduit positioned in the upper portion of said vessel and extending substantially vertically downwardly into the interior of said vessel, with the lower end of said vapor withdrawal conduit being in open communication with the interior of said vessel and being substantially above said liquid withdrawal conduit;
   e. an upwardly inclined annular catch-pan disposed on the outer side of said vapor withdrawal conduit intermediate the top of said vessel and the lower end of said vapor withdrawal conduit;
   f. a downwardly inclined annular drip skirt disposed on the outer side of said vapor withdrawal conduit intermediate said upwardly inclined annular catch-pan and the lower end of said vapor withdrawal conduit; and
   g. at least one drain conduit in open communication with the interior of said vessel at a point substantially removed from and below the lower end of said vapor withdrawal conduit and the lower portion of the annular channel formed between said upwardly inclined catch-pan and the outer side of said vapor withdrawal conduit.

2. The apparatus of claim 1 wherein the upper inlet portion of drain conduit element (g) is positioned inside said vapor withdrawal conduit and communicates with said annular channel through an aperture in the wall of said vapor withdrawal conduit and wherein the lower outlet portion of said drain conduit element (g) is located at a point closer to the vertical wall of said vessel than said upper inlet portion.

3. The apparatus of claim 2 wherein said vapor withdrawal conduit is located along the axis of said cylindrical vessel.

4. The apparatus of claim 3 wherein at least one vertical baffle means is located in a substantially vertical position and extending outwardly from the outer wall of said vapor withdrawal conduit at a point intermediate the interior top portion of said vessel and said annular catch-pan element (c).

5. The apparatus of claim 1 wherein the major diameter of said annular drip skirt is greater than the major diameter of said annular catch-pan.

6. The apparatus of claim 5 wherein said vapor withdrawal conduit is located along the axis of said cylindrical vessel.

7. The apparatus of claim 6 wherein said fluid inlet conduit opens tangentially into said vessel in the upper portion of said vessel.

8. The apparatus of claim 7 wherein the upper inlet portion of drain conduit element (g) is positioned inside said vapor withdrawal conduit and communicates with said annular channel through an aperture in the wall of said vapor withdrawal conduit.

9. The apparatus of claim 8 wherein at least one baffle means is located in a substantially vertical position and extending outwardly from the outer wall of said vapor withdrawal conduit at a point intermediate the interior top portion of said vessel and said annular catch-pan element (c).

* * * * *